(12) United States Patent
Tsukamoto

(10) Patent No.: US 9,022,325 B2
(45) Date of Patent: May 5, 2015

(54) TRAIN CONTROL SYSTEM

(71) Applicant: The Nippon Signal Co., Ltd., Tokyo (JP)

(72) Inventor: Yasushi Tsukamoto, Kuki (JP)

(73) Assignee: The Nippon Signal Co., Ltd., Tokyo (JP)

( * ) Notice: Subject to any disclaimer, the term of this patent is extended or adjusted under 35 U.S.C. 154(b) by 0 days.

(21) Appl. No.: 14/228,156

(22) Filed: Mar. 27, 2014

(65) Prior Publication Data

US 2014/0209760 A1 Jul. 31, 2014

Related U.S. Application Data

(63) Continuation of application No. PCT/JP2012/074284, filed on Sep. 21, 2012.

(30) Foreign Application Priority Data

Sep. 30, 2011 (JP) .................................. 2011-218255

(51) Int. Cl.
| | |
|---|---|
| *B61L 3/12* | (2006.01) |
| *B61L 27/00* | (2006.01) |
| *B61L 3/00* | (2006.01) |
| *B61L 25/02* | (2006.01) |
| *H04W 4/04* | (2009.01) |

(52) U.S. Cl.
CPC ............. *B61L 27/0027* (2013.01); *B61L 3/008* (2013.01); *B61L 3/125* (2013.01); *B61L 25/025* (2013.01); *B61L 2205/04* (2013.01); *B60L 2240/12* (2013.01); *B60L 2240/62* (2013.01); *Y02T 90/16* (2013.01); *Y02T 90/162* (2013.01); *H04W 4/046* (2013.01); *B60L 2240/70* (2013.01); *B60L 2200/26* (2013.01)

(58) Field of Classification Search
USPC ..................... 246/2 R, 4, 6, 2 S, 167 R, 122 R
See application file for complete search history.

(56) References Cited

U.S. PATENT DOCUMENTS

| | | | |
|---|---|---|---|
| 7,201,350 B2 * | 4/2007 | Sugita et al. ............... | 246/122 R |
| 7,742,849 B2 * | 6/2010 | Muinonen et al. ............. | 701/19 |
| 7,983,806 B2 * | 7/2011 | Muinonen et al. ............. | 701/19 |
| 8,239,080 B2 * | 8/2012 | Chun .............................. | 701/19 |

(Continued)

FOREIGN PATENT DOCUMENTS

| | | |
|---|---|---|
| JP | 2000-351371 A | 12/2000 |
| JP | 2002-281614 A | 9/2002 |

(Continued)

*Primary Examiner* — Jason C Smith
(74) *Attorney, Agent, or Firm* — McDermott Will & Emery LLP

(57) ABSTRACT

A train control system includes: an on-board device 3 mounted on each of trains 2; a vehicle radio set 4; wayside radio sets 5 disposed on a ground; and a ground device 6 connected to the wayside radio sets 5. The ground device 6 obtains a location information of a train 2 and a location information of a following train 2 based on results of distance measurement based on communication between the wayside radio sets 5 and the vehicle radio sets 4, and the ground device 6 transmits them to an on-board device 3 of the train 2. The on-board device 3 calculates a stop limit position of the following train 2 based on the location information of the train 2 and the location information of the following train 2, and the on-board device 3 transmits the calculated stop limit position to the following train 2.

6 Claims, 2 Drawing Sheets

(56) References Cited

U.S. PATENT DOCUMENTS

2005/0133673 A1* 6/2005 Sugita et al. ............. 246/167 R
2008/0068164 A1* 3/2008 Campbell .................. 340/572.1
2014/0042279 A1* 2/2014 Kadono et al. ........... 246/167 R
2014/0103166 A1* 4/2014 Asuka et al. ...................... 246/4

FOREIGN PATENT DOCUMENTS

| JP | 2007-331629 A | 12/2007 |
| JP | 2011-031697 A | 2/2011 |

* cited by examiner

TRAIN CONTROL SYSTEM

This application is a continuation application of PCT/JP2012/074284, filed on Sep. 21, 2012.

BACKGROUND OF THE INVENTION

1. Field of the Invention

The present invention relates to a train control system, and more specifically, relates to a train control system that can obtain information about distance between trains and can obtain information about distance between trains from a device other than a ground device, to enable safer travel control of trains.

2. Description of Related Art

Conventionally, in a train control system using a so-called radio distance measurement system, a vehicle radio set is mounted on a train, and a wireless network is formed between the vehicle radio set and a plurality of wayside radio sets, which is spatially separated and disposed along a wayside of a track on which the train travels, and then, a wireless propagation delay (time) between an on-board antenna of the vehicle radio set and a wayside antenna of the wayside radio set is measured, to detect a train location, so that the train control is performed based on the detected train location.

Furthermore, as such a train control system using the radio distance measurement system, conventionally, for example, a technique including: a wireless train location detecting unit that detects a train location on a predetermined track based on a propagation time of a radio wave between a vehicle radio set mounted on a train travelling on the predetermined track and a ground radio set disposed at a predetermined location on the ground; a travel distance calculating unit that calculates a travel distance of the train on the predetermined track based on an output signal of a tachometer generator connected to an axle of the train; a temporary reference location setting unit that sets the detected train location detected by the wireless train location determining unit as a predetermined temporary reference location; and a train location detection calculating unit that detects a train location on the predetermined track based on the travel distance calculated by the travel distance calculating unit based on the temporary reference location set by the temporary reference location setting unit, has been disclosed (see, Japanese Laid-open Patent Application Publication No. 2007-331629, for example).

However, in the conventional technique, a location of a train is detected and a ground device transmits the train location information to an on-board device; however, for example, when a wireless communication state with wayside radio sets is unsatisfactory, or when no communication equipment can be disposed along a wayside of a track, the train cannot receive sufficient information, and accordingly, sufficient travel control of the train cannot be performed based on only the train location information provided from the ground device, and thus, there is a need for an alternative communication system.

SUMMARY OF THE INVENTION

The present invention has been made in view of the above problem, and an object of the present invention is to provide a train control system that can obtain information about distance between trains and can obtain information from a device other than a ground device, to enable safer travel control of trains.

To achieve the above object, an aspect of the present invention according to claim 1 provides a train control system including: an on-board device that is mounted on each of trains travelling on a predetermined track; a vehicle radio set that transmits and receives information of the on-board device; wayside radio sets that are disposed at predetermined locations; and a ground device that is connected to the wayside radio sets in a manner capable of transmitting information thereto and receiving information therefrom, in which, with respect to each of the trains, the ground device obtains a location information of a train and a location information of a following train based on results of distance measurement based on communication between the wayside radio set and the vehicle radio set, and the ground device transmits them to an on-board device of the train, in which the on-board device calculates a stop limit position of the following train based on the location information of the train on which the on-board device is mounted and the location information of the following train, which are transmitted from the ground device, and the on-board device transmits the calculated stop limit position to the following train.

According to another aspect of the present invention according to claim 2, in addition to the features of claim 1, an on-board device of the following train generates a speed pattern based on the location information of the following train and the stop limit position, which is transmitted from the preceding train, to perform travel control of the following train based on the speed pattern.

According to a further aspect of the present invention according to claim 3, a train control system includes: an on-board device that is mounted on each of trains travelling on a predetermined track; a vehicle radio set that transmits and receives information of the on-board device; wayside radio sets that are disposed at predetermined locations; and a ground device that is connected to the wayside radio sets in a manner capable of transmitting information thereto and receiving information therefrom, in which, with respect to each of the trains, the ground device obtains a location information of a train and a location information of a following train based on results of distance measurement based on communication between the wayside radio set and the vehicle radio set, and the ground device calculates a stop limit position of the following train based on the location information of the train and the location information of the following train, and the ground device transmits the calculated stop limit position to a higher level system, in which the higher level system performs transmission to the trains using a satellite system.

According to a further aspect of the present invention according to claim 4, in addition to the features of claim 3, an on-board device of the following train generates a speed pattern based on the location information of the following train and the stop limit position information, which is transmitted from the satellite system, to perform travel control of the following train based on the speed pattern.

According to the embodiment of the invention according to claim 1, the ground device obtains the location information of the train and the location information of the following train based on the communication time between the wayside radio set and the vehicle radio set, and the ground device transmits them to the on-board device, and then, the on-board device calculates the stop limit position of the following train based on the location information of the train on which the on-board device is mounted and the location information of the following train, which are transmitted from the ground device, and the on-board device transmits the calculated stop limit position to the following train. Thus, each of the distances between trains can be appropriately maintained, resulting in the safer travel control of the trains.

According to the embodiment of the invention according to claim 2, the on-board device of the following train generates the speed pattern based on the location information of the following train and the stop limit position information, which is transmitted from the preceding train, to perform the train travel control based on the speed pattern. Thus, each of the distances between the trains can be appropriately maintained, resulting in the safer travel control of the trains.

According to the embodiment of the invention according to claim 3, the ground device obtains the location information of the train and the location information of the following train based on the communication time between the wayside radio set and the vehicle radio set, and the ground device calculates the stop limit position of the following train, and then the ground device transmits the calculated stop limit position to the higher level system, that performs transmission to the trains using the satellite system. Thus, each of the distances between the trains can be appropriately maintained, resulting in the safer travel control of the trains.

According to the embodiment of the invention according to claim 4, the on-board device of the following train generates the speed pattern based on the location information of the following train and the stop limit position information, which is transmitted from the satellite system, to perform the train travel control based on the speed pattern. Thus, each of the distances between the trains can be appropriately maintained, resulting in the safer travel control of the trains.

DESCRIPTION OF THE PREFERRED EMBODIMENTS

Hereinbelow, embodiments of the present invention will be described with reference to the accompanying drawings.

Figure 1:
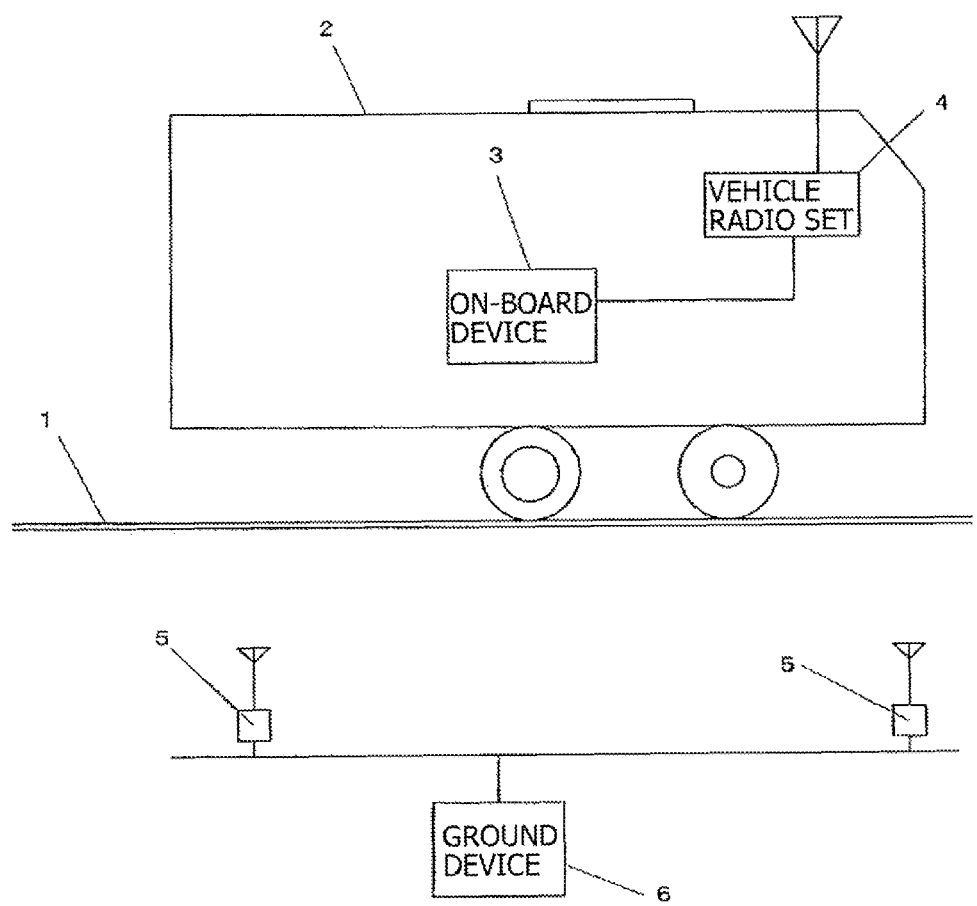
FIG. 1 is a schematic configuration view around a train of a train control system according to an embodiment of the present invention.
Figure 2:
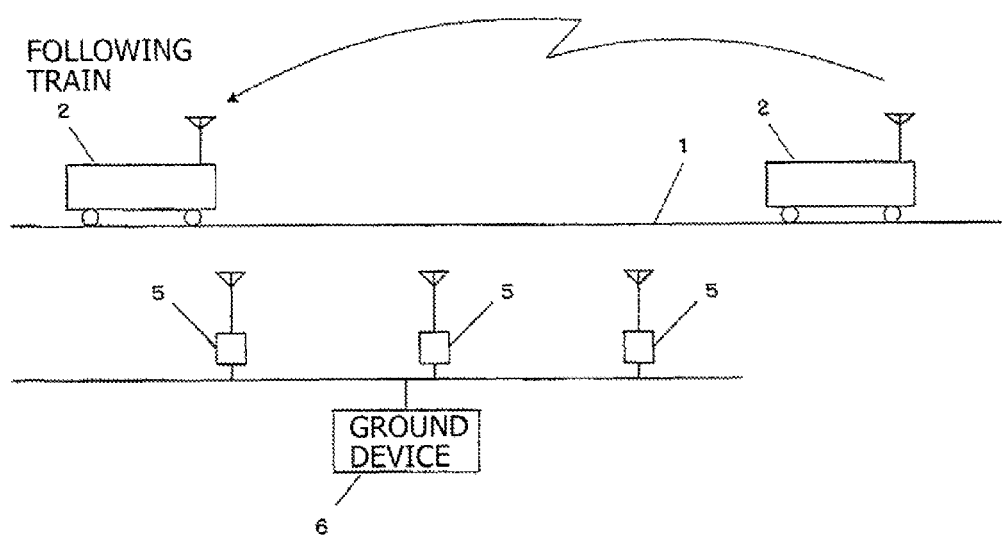
FIG. 2 is an explanatory view illustrating an example of a track of the train control system according to the embodiment of the present invention.

FIGS. 1 and 2 are schematic configuration views illustrating a train control system according to an embodiment of the present invention. In the present embodiment, on each train 2 that travels on a predetermined track 1, an on-board device 3 is mounted. The on-board device 3 includes a data processing unit (not illustrated) which includes a CPU as a main component, and the on-board device 3 is configured to perform various kinds of control, such as speed control and brake control of its train 2.

Furthermore, on each train 2, a vehicle radio set 4 connected to the on-board device 3 is mounted, and along a wayside of the track 1 of the trains 2, a plurality of wayside radio sets 5 that transmits information to and receives information from the vehicle radio set 4 is disposed. Still further, to these wayside radio sets 5, ground devices 6 are connected.

Each ground device 6 is configured to measure a communication time required for communication between the wayside radio sets 5 and the vehicle radio sets 4, and configured to calculate distances between the wayside radio sets 5 and the trains 2 based on results of distance measurement based on a difference in time, to detect which locations the trains 2 exist at that time. Then, to each on-board device 3 of the trains 2 via the wayside radio sets 5 and its vehicle radio set 4, the ground device 6 is configured to transmit location information of a train 2 on which the on-board device 3 is mounted and location information of another train 2, which travels behind the train 2, i.e., following train 2, at that time.

The on-board device 3 is configured to then calculate a stop limit position of the following train 2 based on the location information of the train 2, on which the on-board device 3 is mounted, and the location information of the following train 2, which are transmitted from the ground device 6, and the on-board device 3 transmits the stop limit position to the following train 2. Here, for example, as a transmission path from the on-board device 3 of the preceding train 2 to the following train 2, the vehicle radio set 4 of the preceding train 2 may directly transmit information to the vehicle radio set 4 of the following train 2, or alternatively, the vehicle radio set 4 of the preceding train 2 may transmit information to the vehicle radio set 4 of the following train 2 via the wayside radio set 5 or the wayside radio sets 5.

In the following train 2, the on-board device 3 is configured to generate a speed pattern according to brake performance of the following train 2, on which the on-board device 3 is mounted, based on the location information of the following train and the stop limit position information, so that when a running speed exceeds the speed pattern, the on-board device 3 controls a brake device to reduce the running speed to a speed which is not more than the speed pattern.

Furthermore, in the present embodiment, based on the train location information transmitted from the ground device 6, the stop limit position information is transmitted to the following train 2; however, for example, the ground device 6 may obtain the location information of trains and the ground device 6 may calculate the stop limit position information of each train 2, and then, the location information of the trains and the stop limit position information obtained by the ground device 6 may be transmitted to a higher level system, and the higher level system may transmit them to each train 2 using a satellite communication system, for example.

Next, a control operation according to the present embodiment will be described.

First, the wayside radio set 5 and the vehicle radio set 4 communicate with each other. Then, by measuring communication time thereof, each ground device 6 calculates distances between the wayside radio sets 5 and the trains 2, to detect locations of the trains 2 at that time.

Then, each ground device 6 transmits the location information of the trains 2 to the on-board devices 3 via the wayside radio sets 5 and the vehicle radio sets 4. Each on-board device 3 calculates a stop limit position of the following train 2, based on the location information of the train 2 on which the on-board device 3 is mounted and the location information of the following train 2, which are transmitted from the ground device 6, and transmits the calculated stop limit position to the following train 2.

Then, in the following train 2, the on-board device 3 generates a speed pattern according to brake performance of the following train 2 on which the on-board device 3 is mounted, based on the location information of the trains and the stop limit position information, to perform the train 2 travel control based on the speed pattern.

As described above, in the present embodiment, each ground device 6 transmits the location information of the trains to each on-board device 3 via the wayside radio sets 5 and the vehicle radio set 4, and the on-board device 3 obtains the stop limit position information of the following train 2 based on the location information of the trains, and the on-board device 3 transmits the obtained stop limit position information to the following train 2, and then, the following train 2 generates the speed pattern according to the brake performance of the following train 2 on which the on-board device 3 is mounted, to perform the train 2 travel control based on the speed pattern. Thus, each distance between the trains 2 can be appropriately maintained, resulting in the safer travel control of the trains 2.

Furthermore, the present invention is not limited to the present embodiment, and various modifications can be made without departing from the scope of the present invention.

It should be noted that the entire contents of Japanese Patent Application No. 2011-218255, filed on Sep. 30, 2011, on which convention priority is claimed, is incorporated herein by reference.

It should also be understood that many modifications and variations of the described embodiments of the invention will be apparent to a person having an ordinary skill in the art without departing from the spirit and scope of the present invention as claimed in the appended claims.

What is claimed is:

1. A train control system comprising:
an on-board device that is mounted on each of trains travelling on a predetermined track;
a vehicle radio set that transmits and receives information of the on-board device;
wayside radio sets that are disposed at predetermined locations; and
a ground device that is connected to the wayside radio sets in a manner capable of transmitting information thereto and receiving information therefrom,
wherein, with respect to each of the trains, the ground device obtains a location information of a train and a location information of a following train following the train, and the ground device transmits them to an on-board device of the train,
wherein the on-board device of the train, which precedes the following train, calculates a stop limit position of the following train based on the location information of the train and the location information of the following train, which are transmitted from the ground device, and the on-board device transmits the calculated stop limit position to the following train.

2. The train control system according to claim 1, wherein an on-board device of the following train generates a speed pattern based on the location information of the following train and the stop limit position information, which is transmitted from the preceding train directly or via at least one of the wayside radio sets, to perform travel control of the following train based on the speed pattern.

3. A train control system comprising:
an on-board device that is mounted on each of trains travelling on a predetermined track;
a vehicle radio set that transmits and receives information of the on-board device;
wayside radio sets that are disposed at predetermined locations; and
a ground device that is connected to the wayside radio sets in a manner capable of transmitting information thereto and receiving information therefrom,
wherein, with respect to each of the trains, based on a location information of a train and a location information of a following train, the ground device calculates a stop limit position of the following train, and the ground device transmits the calculated stop limit position to,
each of the trains using a satellite system.

4. The train control system according to claim 3, wherein an on-board device of the following train generates a speed pattern based on the location information of the following train and the stop limit position information, which is transmitted from the satellite system, to perform travel control of the following train based on the speed pattern.

5. The train control system according to claim 1, wherein the ground device obtains the location information of each of the trains based on results of distance measurement based on communication between the wayside radio set and the vehicle radio set.

6. The train control system according to claim 3, wherein the ground device obtains the location information of each of the trains based on results of distance measurement based on communication between the wayside radio set and the vehicle radio set.

* * * * *